(12) United States Patent
Lin

(10) Patent No.: US 6,470,110 B1
(45) Date of Patent: Oct. 22, 2002

(54) MONOLITHIC INTEGRATION OF CONTROL ELEMENTS AND MICRO-MIRROR IN AN OPTICAL SWITCH

(75) Inventor: Lih Y. Lin, Little Silver, NJ (US)

(73) Assignee: Tellium, Inc., Oceanport, NJ (US)

( * ) Notice: Subject to any disclaimer, the term of this patent is extended or adjusted under 35 U.S.C. 154(b) by 78 days.

(21) Appl. No.: 09/691,193

(22) Filed: Oct. 19, 2000

(51) Int. Cl.[7] ................................................. G02B 6/26
(52) U.S. Cl. ............................. 385/18; 385/15; 385/16; 385/17; 385/14
(58) Field of Search ............................. 385/16, 17, 18, 385/15, 14, 20, 21, 22, 23, 24

(56) References Cited

U.S. PATENT DOCUMENTS

| | | | | |
|---|---|---|---|---|
| 4,566,935 A | * | 1/1986 | Hornbeck | 156/626 |
| 4,662,746 A | * | 5/1987 | Hornbeck | 350/269 |
| 5,684,631 A | * | 11/1997 | Greywall | 359/565 |
| 5,696,619 A | * | 12/1997 | Knipe et al. | 359/224 |
| 2002/0006248 A1 | * | 1/2002 | Makino et al. | 385/18 |
| 2002/0009256 A1 | * | 1/2002 | Chertkow et al. | 385/18 |

* cited by examiner

Primary Examiner—Brian Healy
(74) Attorney, Agent, or Firm—Morgan, Lewis & Bockius LLP

(57) ABSTRACT

An optical device includes a compact and low cost integration of a movable micro-mirror and control mechanisms. The optical devices may be manufactured using microelectromechanical system (MEMS) technology. The optical device may be used in a high port count optical switch, such as an optical cross connect for use in an optical telecommunication system, that uses beam steering to couple light from input fibers to selected output fibers.

19 Claims, 4 Drawing Sheets

FIGURE 4B
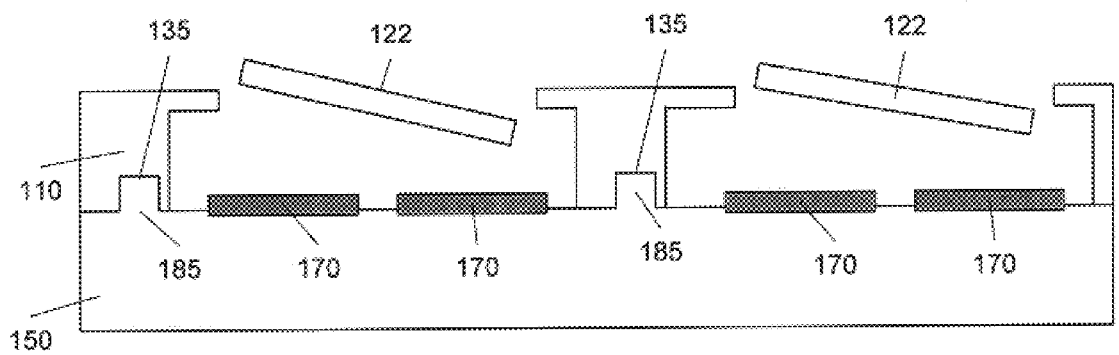
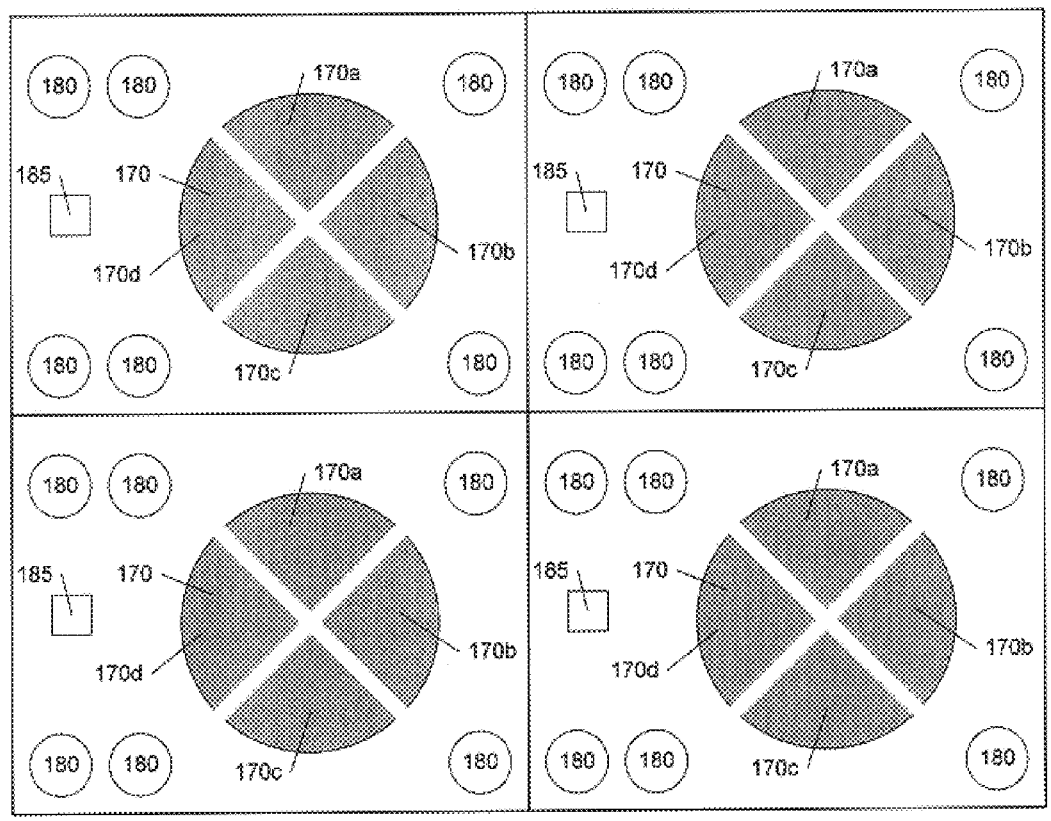
FIGURE 5

MONOLITHIC INTEGRATION OF CONTROL ELEMENTS AND MICRO-MIRROR IN AN OPTICAL SWITCH

RELATED APPLICATIONS

This application is related in subject matter to U.S. application Ser. No. 09/691,225, filed concurrently herewith and expressly incorporated by reference herein.

BACKGROUND OF THE INVENTION

1. Field of the Invention

The present invention relates to an optical switch, and more particularly to the monolithic integration of target and servo radiation emitting devices with micro-machined micro-mirrors in an optical switching device.

2. Description of the Related Art

Increasing demands for high-speed Internet service and wireless communications are soon expected to outstrip current telecommunications capacity. Because optical fiber networks are capable of transmitting huge volumes of data at blinding speeds, telecommunications carriers are turning to optical fiber networks in an effort to meet future needs.

In order to implement tomorrow's optical fiber networks, the telecommunications industry needs new optical devices that are inexpensive, efficient, and scalable to accommodate future optical telecommunications network expansion. Telecommunications providers prefer optical fiber networks that can be reconfigured quickly and efficiently. This gives the optical network the flexibility to accommodate growth and changes in future communications patterns. The ability to reconfigure quickly and efficiently also enables the network to restore failed communications by rerouting the communications to bypass the failure.

Optical fiber networks can be reconfigured at network nodes using optical switches to change the coupling between incoming optical fibers and outgoing optical fibers. Currently under development are optical switches that use movable micro-mirrors. These optical switches couple the optical signals between input and output fibers entirely in optical form, instead of converting the optical signals to electrical signals, switching the electrical signals, and converting the switched electrical signals back to optical signals.

To successfully operate such switches, the components—including fibers, lenses, and the micro-mirrors—must be properly aligned and the angular position of the movable micro-mirrors must be precisely controlled. If the angular position of the movable micro-mirrors is off and/or if the other components are not properly aligned, some or all of the light from the input fibers will not reach the selected output fiber. There remains a need in the art for an optical switch having a compact and cost effective arrangement of movable micro-mirrors and associated control elements.

SUMMARY OF THE INVENTION

The present invention has been made in view of the above circumstances and has as an object to provide an optical switch having a compact and cost effective integration of a movable micro-mirror and associated control elements.

A further object of the invention is to provide an optical device having movable micro-mirrors integrated with associated control elements.

A further object is to provide an optical switching system and method that allows the angular position of a movable micro-mirror to be detected.

Additional objects and advantages of the invention will be set forth in part in the description that follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiment(s) of the invention and together with the description, serve to explain the principles of the invention.

FIGS. 4A and 4B illustrate cross-sectional views of the embodiment of a micro-mirror arrangement shown in FIG. 3.

FIG. 5 illustrates a top view of an embodiment of a sub-mount for a micro-mirror arrangement shown in FIG. 3.

DESCRIPTION OF THE PREFERRED EMBODIMENT

Reference will now be made in detail to the present exemplary embodiment(s) of the invention illustrated in the accompanying drawings. Wherever possible, the same reference numbers will be used throughout the drawings to refer to the same or like parts.

Figure 1:
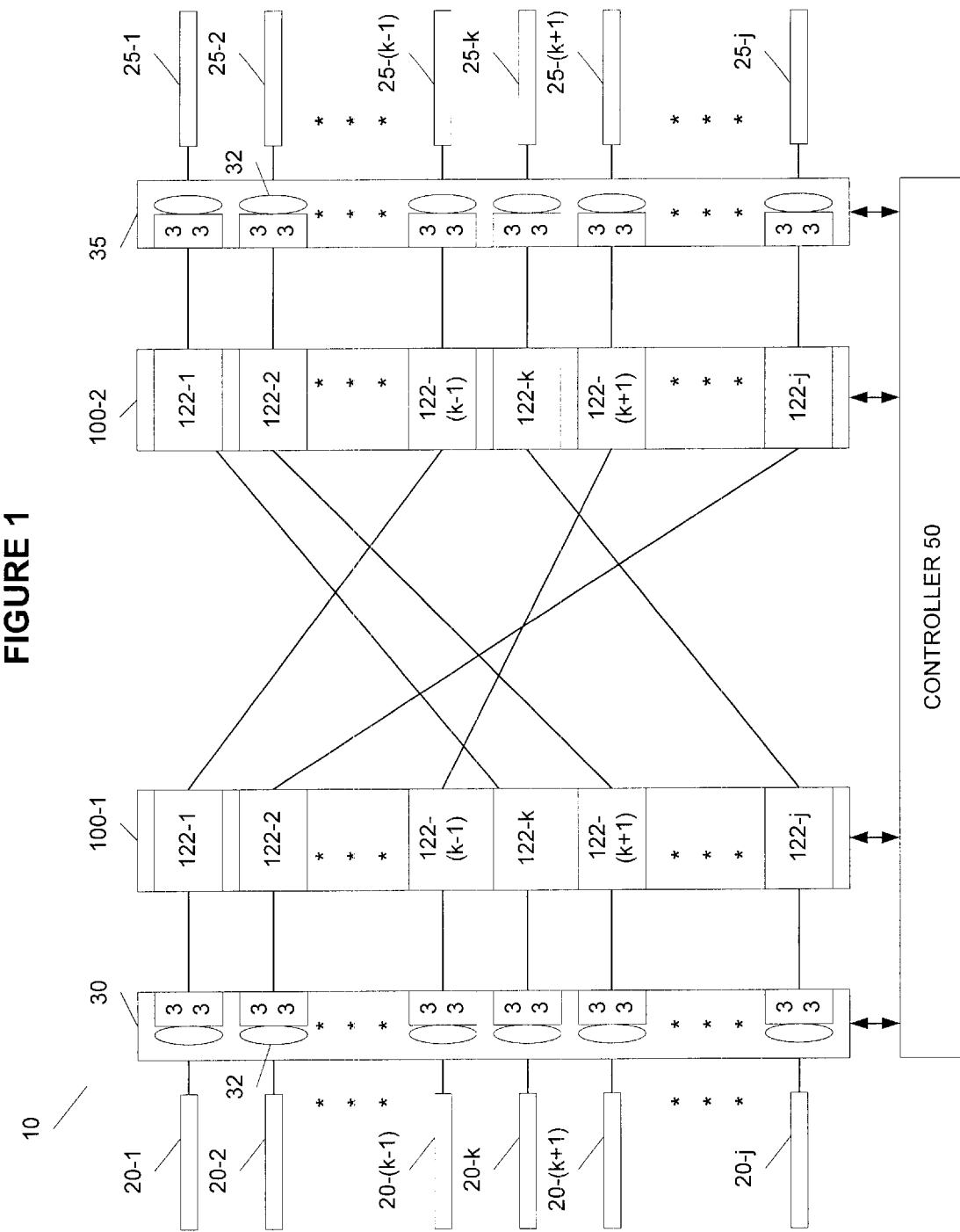
FIG. 1 provides a schematic of an optical switch design that includes micro-mirrors in accordance with the present invention.

The present invention is particularly useful in optical switches for optical telecommunications network systems that carry optical communications signals, such as wavelength division multiplexed (WDM) signals, over optical fibers. FIG. 1 illustrates a schematic of such an optical switch 10. The optical switch 10 according to the present invention may be configured as an optical cross connect (OXC), an add-drop multiplexer (ADM), or another optical switch arrangement.

The optical switch 10 switches optical signals from a plurality of input optical fibers 20-1 to 20-j (collectively "input optical fibers 20") to selected output fibers 25-1 to 25-j (collectively "output optical fibers 25"). The input optical fibers 20 and output optical fibers 25 may be arranged in any way, for example a k x j/k rectangular array, such as a square array. The present invention is not limited by the types of the optical signals carried by the input optical fibers 20 and output optical fibers 25. Each optical input fiber 20 may carry WDM signals, a single wavelength optical signal that was demultiplexed from a WDM signal by a wavelength division demultiplexer, or other types of optical signals. Similarly, each optical output fiber 25 may carry WDM signals, single wavelength optical signal to be multiplexed with other optical signals by a wavelength division multiplexer, or other types of optical signals. The optical signals typically carry information and may have wavelengths of about 1300–1500 nm, for example. While FIG. 1 shows a schematic of an embodiment with j input optical fibers 20 and j output optical fibers 25, the number of input optical fibers may differ from the number of output optical fibers.

The input optical fibers 20 carry optical signals that are supplied, respectively, to a lens arrangement 30. The lens arrangement 30 may include a plurality of micro-lenses 32 arranged in an array. The micro-lenses 32 are preferably arranged so that each input optical fiber 20 is aligned with a micro-lens 32. In this way, optical signals emitted from an input fiber 20 will pass through one of the micro-lenses 32. The micro-lenses 32 direct optical beams from the input optical fibers 20 to a first arrangement of micro-mirrors 100-1, which will be described in greater detail below. The lens arrangement 30 may also include optical detectors 33 that are aligned with the micro-lenses 32 or have a fixed relationship therewith. The optical detectors 33 are capable of sensing optical signals, as discussed in greater detail below. For example, the lens arrangement 30 may be of the type disclosed in U.S. application Ser. No. 09/691,225, which incorporate integrated beamsplitters and quad detectors 33.

Alternatively, detectors 33 may be provided separately from the lens arrangement 30. Depending on the location of the detectors 33, a mechanism may be provided to direct light to the detectors 33. For example, a mirror (not shown) may be interposed between the lens arrangement 30 and the first micro-mirror arrangement 100-1. A dichroic mirror may be used to pass light of the frequency emitted from the input optical fibers 20, but reflect light at other frequencies. A half-silvered mirror may be used to pass light originating from the input fibers 20, but reflect light propagating in the opposite direction. The reflected light may be directed to the detectors 33. As a further alternative, the detectors 33 may be replaced with radiation-emitting elements, such as light-emitting diode (LED), laser, or other light-emitting device.

The first micro-mirror arrangement 100-1 includes a plurality of movable micro-mirrors 122. The micro-mirrors 122 may be arranged in an array, e.g., a rectangular or square array. Of course, other arrangements of the micro-mirrors 122 may be used as well. In a preferred embodiment, each input optical fiber 30 corresponds to one micro-lens 32 of the first lens arrangement 30 and one micro-mirror 122 of the first micro-mirror arrangement 100-1. Using the micro-mirrors 122 and responsive to control signals, the first micro-mirror arrangement 100-1 couples the optical beams from the lens array 30 to selected movable micro-mirrors 122 of a second arrangement of micro-mirrors 100-2. The second micro-mirror arrangement 100-2 includes micro-mirrors 122 that may be arranged in an array, e.g., a square or rectangular array or other arrangement. The second micro-mirror arrangement 100-2 need not match the first micro-mirror arrangement 100-1.

Each micro-mirror 122 of the first arrangement 100-1 is preferably movable to permit an input beam to be reflected by the micro-mirror 122 to any micro-mirror 122 of the second arrangement 100-2. The micro-mirrors 122 of the second arrangement 100-2, also responsive to control signals, receives and couples the optical beams through a second lens array 35 to output fibers 25. The second lens arrangement 35 includes micro-lenses 32, which may be arranged in an array, aligned with output optical fibers 25. Micro-lenses 32 direct the optical beams into output optical fibers 25. Accordingly, optical signals carried on input optical fibers 20 may be selectively coupled to output optical fibers 25. The lens arrangement 35 may also include light-sensitive elements or optical detectors 33 that are aligned with the micro-lenses 32 or that have a fixed relationship therewith. The optical detectors 33 are capable of sensing optical signals, as discussed in greater detail below. For example, the lens arrangement 30 may be of the type disclosed in U.S. application Ser. No. 09/691,225, which incorporate integrated beamsplitters and quad detectors 33. As described above, the detectors 33 may be provided separately from the lens arrangement 30 and, if desirable, additional structure may be used to direct optical signals to the detectors, as described above. The detectors 33 may be replaced with radiation-emitting elements, such as light-emitting diode (LED), laser, or other light-emitting device, as a further alternative as described above.

A controller 50 may be used to receive and process sensor signals (e.g., from the detectors 33 and/or from the micro-mirror arrangements 100-1, 100-2) and other control inputs and generate output control signals to control the position of the micro-mirrors 122 of the first and second micro-mirror arrangements 100-1, 100-2. The controller 50 may be, for example, a computer or application-specific circuitry. The micro-mirrors 122 of the second micro-mirror arrangement 100-2 are preferably movable to permit a light beam received from any of the micro-mirrors 122 of the first arrangement 100-1 to be directed through a micro-lens 32 of second lens arrangement 35 to an output optical fiber 25. In one embodiment, each micro-mirror 122 of the second arrangement 100-2 corresponds to one micro-lens 32 of the second lens arrangement 35 and one output optical fiber 25.

The micro-mirror arrangements 100-1 and 100-2 can be controlled to redirect or switch the coupling of optical signals. For example, as shown in FIG. 1, movable micro-mirror 122-1 of arrangement 100-1 directs an optical signal to movable micro-mirror 122-(k+1) of arrangement 100-2. However, responsive to control signals, movable micro-mirror 122-1 of arrangement 100-1 may redirect the optical signal it receives from input optical fiber 20-1 to movable micro-mirror 122-2 of arrangement 100-2. Micro-mirror 122-2 may be controlled to receive the optical signal and provide it to optical fiber 25-2.

While FIG. 1 shows a one stage switching arrangement, one or more additional stages of micro-mirror arrangements may be interposed between micro-mirror arrangements 100-1 and 100-2 to form a multi-stage switching arrangement.

Figure 2:
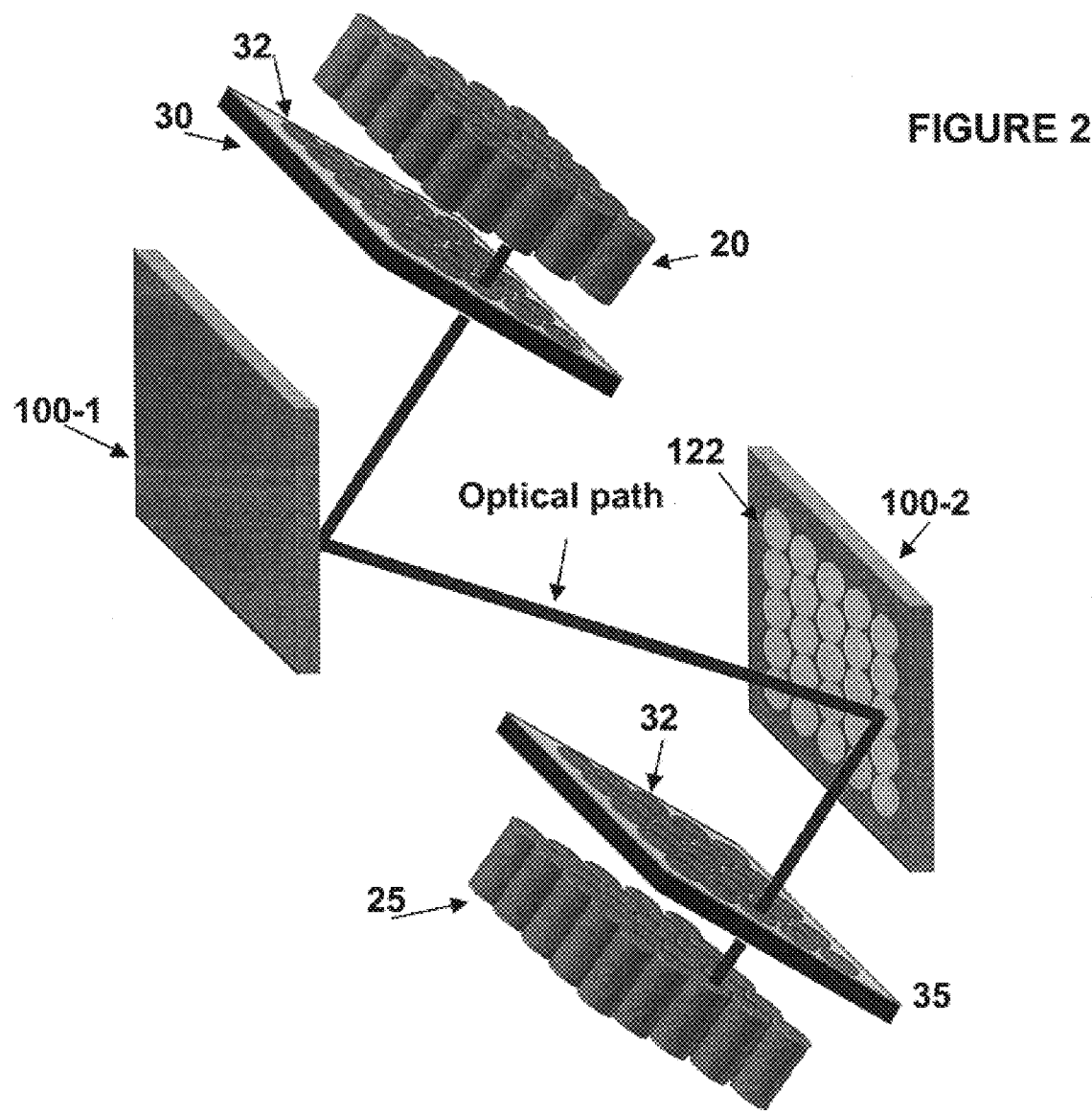
FIG. 2 illustrates an embodiment of an optical switch design using micro-mirrors.

FIG. 2 shows an example of an embodiment of an optical switch 10 according to the schematic of FIG. 1. As shown in FIG. 2, the input optical fibers 20 and the output optical fibers 25 are arranged in two-dimensional arrays. Similarly, lens arrangements 30 and 35 include micro-lenses 32 arranged in arrays and aligned with the input optical fibers 20 and the output optical fibers 25, respectively. The lens arrangement 30, 35 also include detectors 33 aligned with the micro-lenses 32 on the opposite sides of the substrates of the lens arrangements. The micro-mirrors 122 of the first and second arrangements 100-1, 100-2 are formed by microelectromechanical system (MEMS) elements arranged in an array. The first MEMS arrangement 100-1 is positioned at an angle to lens array 30 and generally faces the second MEMS arrangement 100-2 with some offset. The second MEMS array 100-2 is positioned at an angle to the second lens array 35. Accordingly, an optical path from an input fiber to an output fiber traverses a generally "Z" shaped path, as illustrated in FIG. 2.

As shown in FIG. 2 with a single optical beam, the first lens array 30 receives the input optical beam from the input optical fibers 20 at a micro-lens 32 and directs the input beam to a movable micro-mirror 122 of the first MEMS arrangement 100-1. Depending on the angular position of the movable micro-mirror 122, the input optical beam is reflected to a selected movable micro-mirror 122 of the second MEMS arrangement 100-2. The movable micro-mirror 122 of the second MEMS arrangement 100-2 reflects the input optical beam through a lens 32 of the second lens array 35 to a selected one of the output optical fibers 25. Thus, the optical beam passes out of the input optical fiber, passes through a lens 32 of the first lens array 30, is reflected by the first and second MEMS arrangements 100-1, 100-2, passes through a lens 32 of the second lens array 30, and is directed into a selected output optical fiber 25.

Figure 3:
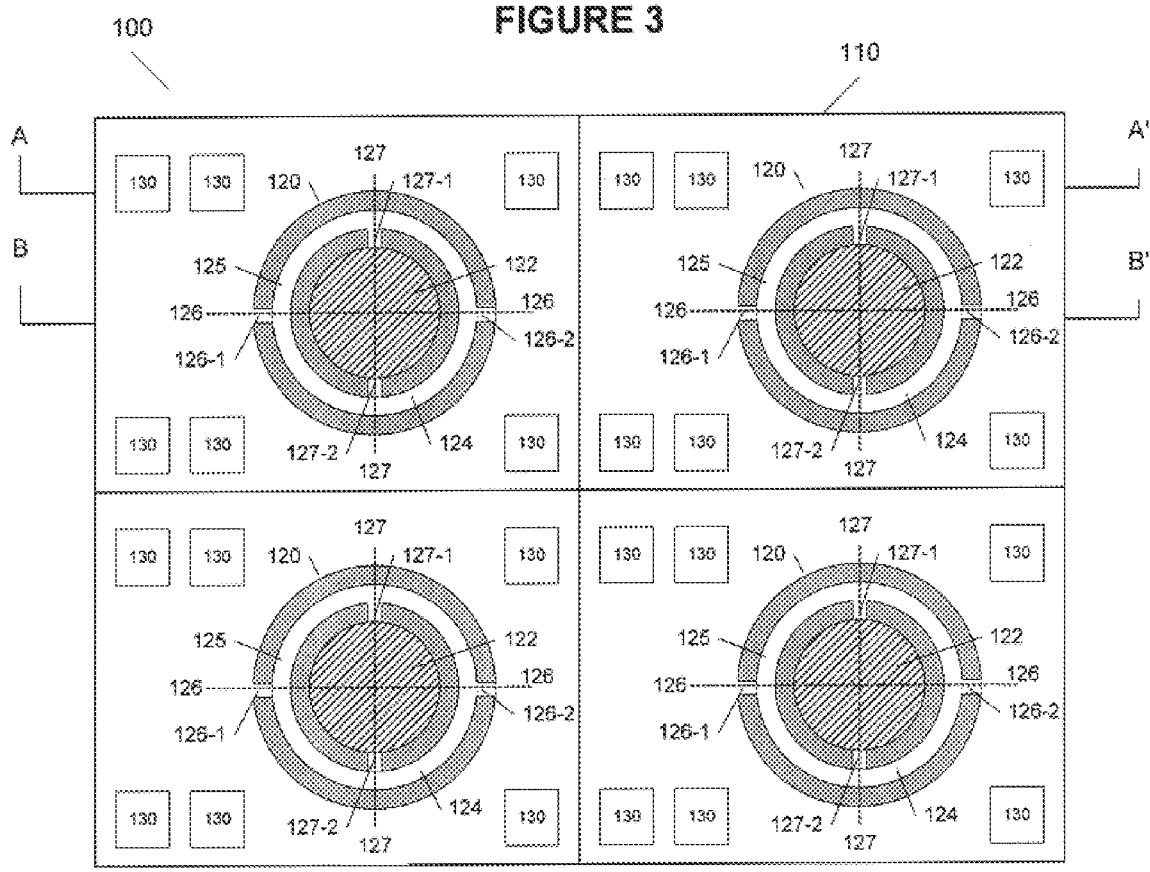
FIG. 3 illustrates a top view of an embodiment of a micro-mirror arrangement in accordance with the present invention.
Figure 4A:
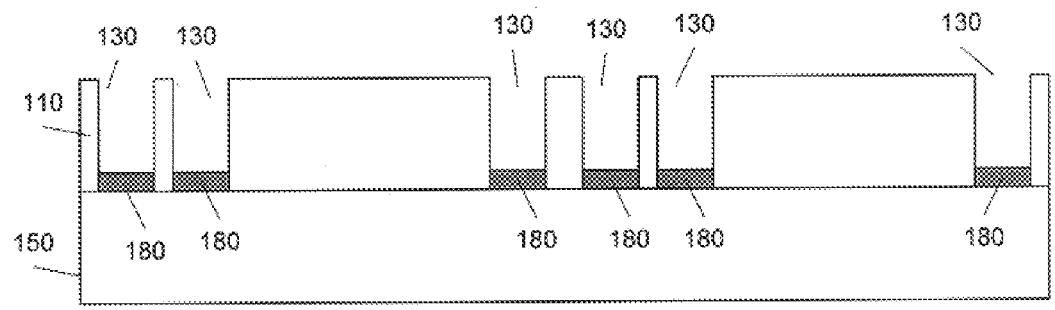

FIGS. 3 and 4A–4B illustrate top and cross-sectional views of an exemplary embodiment of a MEMS micro-mirror arrangement 100. FIG. 4A represents a cross section of the MEMS micro-mirror arrangement 100 of FIG. 3 taken along an axis A—A'. FIG. 4B represents a cross section of the MEMS micro-mirror arrangement 100 of FIG. 3 taken along an axis B—B'. As should be apparent, FIGS. 3, 4A, and 4B provide simplified illustrations of MEMS micro-mirror arrangement 100 for explaining the invention.

The micro-mirror arrangement 100 may be formed using MEMS technology. Of course, this is exemplary and other technologies may be used consistent with the present invention. The arrangement 100 includes a substrate 110, which may be formed, for example, of single-crystalline silicon on which a plurality of micro-mirrors are formed in an array. More particularly, the substrate 110 includes a plurality of micro-mirrors 122 and corresponding mirror mounts 124 for mounting the micro-mirrors 122. The micro-mirrors 122 may be formed with a gold coating, for example, to provide a reflective surface. Each micro-mirror 122 and corresponding mirror mount 124 form a movable micro-mirror unit 120. FIG. 3 shows four movable micro-mirror units 120 for purposes of illustration. Of course, the micro-mirror arrangement 100 may have more or fewer than four movable micro-mirror units 120. As shown in FIG. 3, each mirror mount 124 may be formed as a gimbal. In particular, the mirror mount 124 includes a mounting arm 125 coupled to the remainder of the substrate 110 by pivot arms 126-1, 126-2 and coupled to the micro-mirror 122 by pivot arms 127-1, 127-2. Pivot arms 126-1 and 126-2 enable the mounting arm 125, and thus the micro-mirror 122, to pivot with respect to the substrate 110 about a first axis 126. Pivot arms 127-1 and 127-2 enable the micro-mirror 122 to pivot with respect to the mounting arm 125 about a second axis 127 orthogonal to the first axis 126. FIG. 3 shows the mounting arm 125 to be circular for purposes of illustration and not by way of limitation. Of course, the mounting arm 125 may be, for example, rectangular, elliptical, or other closed loop shape, or U-shaped, or arcuate.

Substrate 110 also includes a plurality of light-transmissive windows 130 spaced about the micro-mirror assembly 120. The windows 130 may be holes formed through the substrate 110.

The micro-mirror arrangement 100 further includes a sub-mount 150 beneath the substrate 110. The sub-mount 150 may be formed, for example, of silicon or another semiconductive material or compound, or an insulative material on which a semiconductive material or compound may be formed. FIG. 5 provides a view of the top of sub-mount 150. Similar to FIGS. 3, 4A, and 4B, FIG. 5 is intended to provide a simplified rendering of sub-mount 150 for purposes of explaining the invention.

As shown in FIG. 5, the sub-mount 150 includes a plurality of electrodes 170 arranged in groups corresponding to the movable micro-mirror assemblies 120 and, in particular, to the micro-mirror 122 and mounting arm 125 of the movable micro-mirrors 120. Electrodes 170 act on the micro-mirror 122 and mounting arm 125 to control the angular position of the micro-mirror 122 by electrostatic force. In the embodiment of FIG. 5, the electrodes 170a and 170c control the angular position of the micro-mirror 122 about axis 126. Electrodes 170b and 170d control the angular position of the micro-mirror 122 about axis 127. Consequently, by appropriate control of electrodes 170a–170d, the surface angle of micro-mirror 122 may be controlled. Accordingly, the micro-mirror 122 can be used to steer an incident light beam to a particular location, a function useful in optical switches. Control circuitry for driving the electrodes 170 may employ analog and/or digital designs. The control circuitry may be integrated into the sub-mount or may be provided by one or more separate driver chips.

The sub-mount 150 further includes a plurality of radiation-emitting elements 180, such as light-emitting diodes (LEDs) or vertical cavity surface emitting lasers (VCSELs). The radiation-emitting elements 180 may be formed in or on the sub-mount 150 using appropriate semiconductor processing steps. One or more of the radiation-emitting elements 180 may be replaced by one or more light sensitive elements, such as photodetectors or the like. The radiation emitting elements 180 are positioned on the sub-mount 150 in alignment with the light transmissive windows 130 of the substrate 110. Accordingly, when the substrate 110 is mounted on sub-mount 150, as shown in FIG. 4A, the radiation-emiting elements 180 of the sub-mount 150 register with the light transmissive windows 130 of the substrate 110 so that light generated by the radiation-emitting elements 180 can emerge from the upper surface of the substrate 110. Alternatively, the radiation-emitting elements 180 may be formed on or in the upper surface of the substrate 110. In addition, as shown in FIG. 4B, the movable micro-mirror assembly 120 registers with the electrodes 170 to enable the electrodes 170 to control the angular position of the micro-mirror 122, as described above.

Substrate 110 and sub-mount 150 are aligned during mounting. Alignment may be facilitated by forming alignment structures on one or both of the substrate 110 and the sub-mount 150. For example, alignment grooves 135 may be formed in the bottom surface of the substrate 110, for example, by etching. Corresponding alignment posts 185 may be formed on the upper surface of the sub-mount 150. By fitting the alignment posts 185 in the alignment grooves 135, the substrate 110 and the sub-mount 150 may be properly aligned with each other. Of course, other alignment schemes may be used consistent with the present invention. During or following alignment, the substrate 110 and sub-mount 150 may be secured together.

The micro-mirror arrangement 100 may be employed in optical switches, either in array form or individually after dicing the substrate/sub-mount combination. For example, the movable micro-mirror assemblies 120 may be used in the optical switches disclosed in FIGS. 1 and 2 and, in particular, high port count MEMS optical switch fabrics. The radiation-emitting elements 180 provide a way of facilitating micro-mirror angular control in high-port count MEMS switch fabrics using analog beam steering architecture by sending targeting and/or servo signals from radiation-emitting elements 180, which may be-used in optical cross-connects with all-optical switch fabrics. In particular, the radiation-emitting elements 180 of a micro-mirror arrangement 100-2 can be used to determine the position of micro-mirrors 122 of micro-mirror arrangement 100-1. Similarly, the radiation-emitting elements 180 of a micro-mirror arrangement 100-1 can be used to determine the position of micro-mirrors 122 of micro-mirror arrangement 100-2.

For example, radiation (such as visible light) may be emitted from radiation-emitting elements 180 of arrangement 100-2. The radiation will diverge as it travels away from arrangement 100-2. Some of the light will be reflected from micro-mirrors 122 of arrangement 100-1 and can be detected by one or more of the detectors 33. The detectors 33 are preferably in fixed spatial location with respect to the lens arrangement and substrate 110 of the micro-mirror arrangement. The detector information can be supplied to the controller 50, which may then determine the angular position of the micro-mirror 122. Moreover, the controller 50 may generate control signals that are applied to the electrodes 170 to move an individual micro-mirror 122. The micro-mirror 122 can be scanned and/or adjusted to calibrate the micro-mirror angular position servo control.

The radiation-emitting elements 180, as well as the micro-mirrors 122, can be controlled individually or by groups. The elements 180, for example, may be selectively turned on or off to monitor, test, and/or calibrate individual micro-mirrors 122. Alternatively or in addition, the elements 180 may emit distinctive radiation so that the radiation from one or more elements 180 can be distinguished from radiation from other elements. The distinctive radiation may be radiation of different frequency or frequencies, or radiation that is distinctively modulated. The radiation-emitting elements 180 may be operated at the same time as optical signals from the input fibers 20 are reflected by the micro-mirror arrangements 100-1, 100-2 without interference. For example, the radiation from the elements 180 may differ, e.g., in frequency or wavelength, from the light beams emitted from the input fibers 20.

The radiation-emitting elements 180 can also be used to position the micro-mirror arrangements 100, the lens arrangements 30, 35, and the fibers 20, 25. As noted above, micro-mirror arrays 100-1, 100-2 may include radiation-sensitive detectors instead of, or in addition to, radiation emitting elements 180. In such a case, radiation-emitting elements may be provided with the lens arrangements 30, 35 to emit radiation for detection by the detectors in the micro-mirror arrangements 100, as the case may be. Further, the light beams from the input optical fibers 20 may be used to control, monitor, calibrate, and/or test the micro-mirrors 122 of arrangement 100-1 using detectors in arrangement 100-2.

As should be clear from the embodiment described above, the invention presents a way of integrating target and servo radiation-emitting devices with micro-machined micro-mirrors in monolithic forms. These mirror arrangements can then be packaged with fiber/lens arrangements to form an optical switch fabric, as shown in FIG. 2, for example. If the fiber/lens arrangements include the monolithic-integrated beamsplitters/quad-detectors described in U.S. application Ser. No. 09/691,225, filed concurrently herewith, the light emitted from the radiation-emitting devices at the four corners of each micro-mirror can then be detected by the quad-detector, and the angular deflection of the micro-mirror can therefore be determined with precision. The invention thus provides compact and low cost integration of control mechanisms for micro-machined optical switches employing, for example, analog beam-steering architecture, and makes monolithic fabrication of such optical switch fabrics with established control mechanisms possible.

It will be apparent to those skilled in the art that various modifications and variations can be made without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An optical switch comprising:
   a plurality of input optical fibers carrying a plurality of input optical signals;
   a plurality of input optical fibers; and
   an optical switching mechanism for selectively coupling input optical signals from said plurality of input optical fibers to said plurality of output optical fibers, said optical switching mechanism including a substrate having a movable micro-mirror and further including a sub-mount having a plurality of electrodes for controlling the angular position of said movable micro-mirror, wherein said substrate is mounted on said submount.

2. The optical switch according to claim 1, wherein said submount further comprises a radiation-emitting device.

3. The optical switch according to claim 2, wherein said substrate comprises a radiation-transmissive window through which radiation from said radiation-emitting device passes.

4. The optical switch according to claim 3, wherein said radiation-emitting device comprises a light-emitting diode.

5. The optical switch according to claim 3, wherein said radiation-emitting device comprises a vertical cavity surface emitting laser.

6. The optical switch according to claim 1, wherein said movable micro-mirror is pivotable relative to said substrate in two orthogonal directions.

7. An optical device comprising:
   a submount having a top surface;
   a movable micro-mirror formed on a substrate, said substrate having a top surface and a bottom surface, said substrate being mounted on said submount such that the bottom surface of said substrate is proximal the top surface of said submount; and
   a plurality of electrodes formed on the top surface of said submount for controlling the angular position of said movable micro-mirror.

8. The optical device according to claim 7, further including a radiation-emitting device formed on the top surface of said submount adjacent to said electrodes.

9. The optical device according to claim 8, wherein said substrate further includes a radiation-transmissive window, said radiation-transmissive window being aligned with said radiation-emitting device when said substrate is mounted on said submount such that radiation from said radiation-emitting device passes through said radiation-transmissive window and away from the top surface of said substrate.

10. The optical device according to claim 7, wherein said movable micro-mirror comprises a mirror mount pivotable about a first axis with respect to said substrate and a micro-mirror mounted to said mirror mount.

11. The optical device according to claim 10, wherein said micro-mirror is pivotable relative to said mirror mount about a second axis orthogonal to said first axis.

12. The optical device according to claim 7, wherein said submount further includes alignment features on its top surface and said substrate includes alignment features on its bottom surface.

13. The optical device according to claim 12, wherein the alignment features on the top surface of the submount comprise posts and the alignment features on the bottom surface of said substrate comprise grooves.

14. An optical switch comprising:

a plurality of input optical fibers carrying a plurality of input optical signals;

a plurality of output optical fibers; and an optical switching mechanism for selectively coupling input optical signals from said plurality of input optical fibers to said plurality of output optical fibers, said optical switching mechanism including a substrate including movable micro-mirrors, a submount including a plurality of electrodes for controlling the angular position of said movable micro-mirrors, and at least one target radiation emitting-element formed in one of the substrate and the submount.

15. The optical switch according to claim 14, wherein said optical switching mechanism includes a first optical switching device and a second optical switching device, said first optical switching device includes a first substrate having adjustable micro-mirrors and a first submount having a plurality of electrodes for controlling the angular position of said micro-mirrors, and said second optical switching device including a second substrate having adjustable micro-mirrors and a second submount having a plurality of electrodes for controlling the angular position of said micro-mirrors, wherein at least the second optical switching device includes the at least one target radiation emitting element.

16. The optical switch according to claim 15, further comprising a radiation-sensitive detector positioned between the input optical fibers and the first optical switching device.

17. The optical switch according to claim 16, wherein said radiation-sensitive detector detects radiation reflected by an adjustable micro-mirror of the first optical switching device, the radiation originating from the target radiation-emitting element.

18. The optical switch according to claim 17, wherein said radiation-sensitive detector is fixed relative to said first optical switching device, and the radiation detected by said radiation-sensitive detector generates detection information for determining the angular position of the adjustable micro-mirror of the first optical switching device.

19. The optical switch according to claim 18, wherein said adjustable micro-mirrors of the first optical switching device pivot relative two orthogonal directions under control of said electrodes.

\* \* \* \* \*